G. W. CURTISS.
CAMERA.
APPLICATION FILED NOV. 29, 1907.
924,147.
Patented June 8, 1909.
5 SHEETS—SHEET 1.
Fig. I
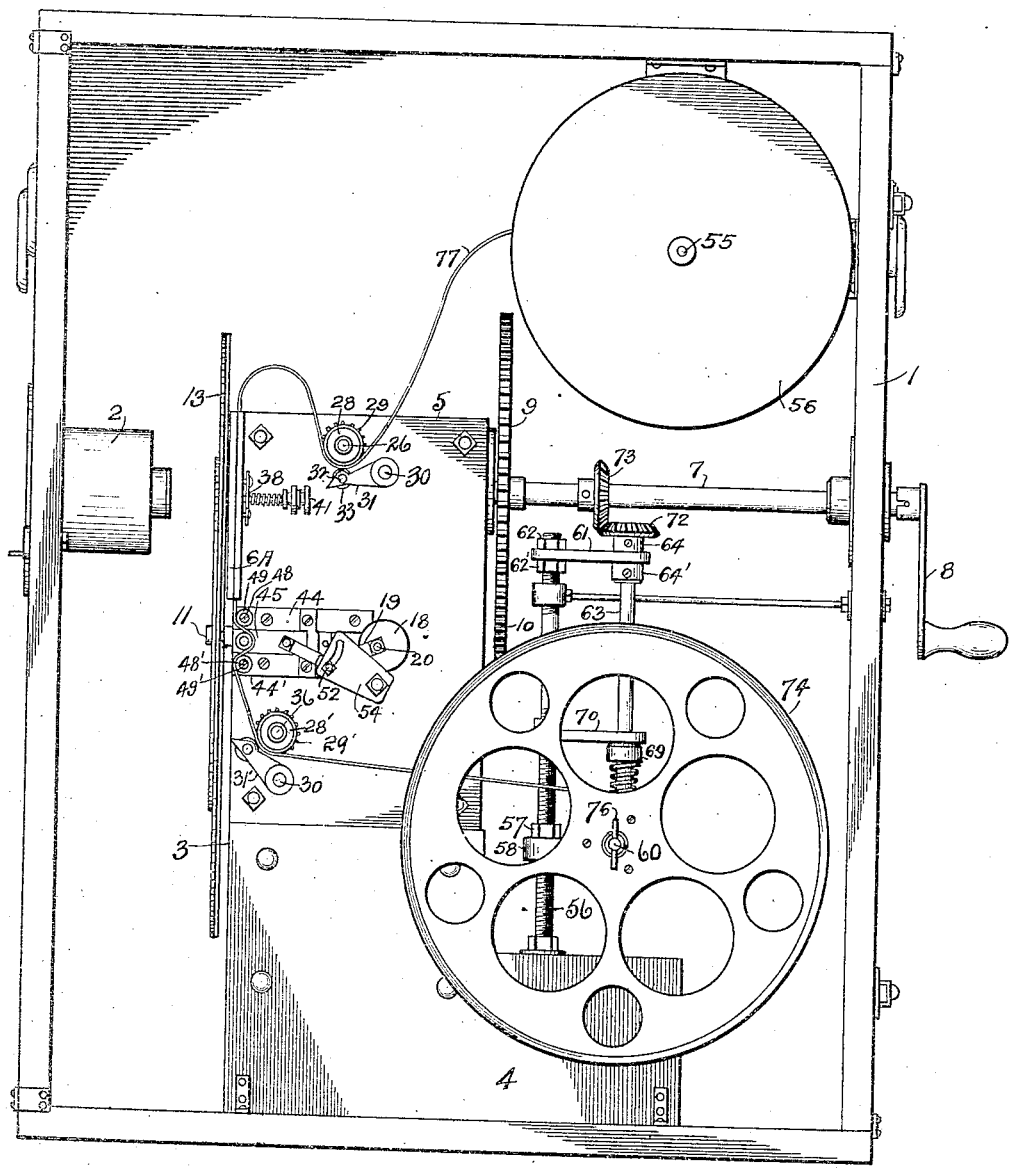
WITNESSES:
R E Hamilton
Stanley Savage.
INVENTOR.
George W. Curtiss
BY Arthur C. Brown
ATTORNEY.

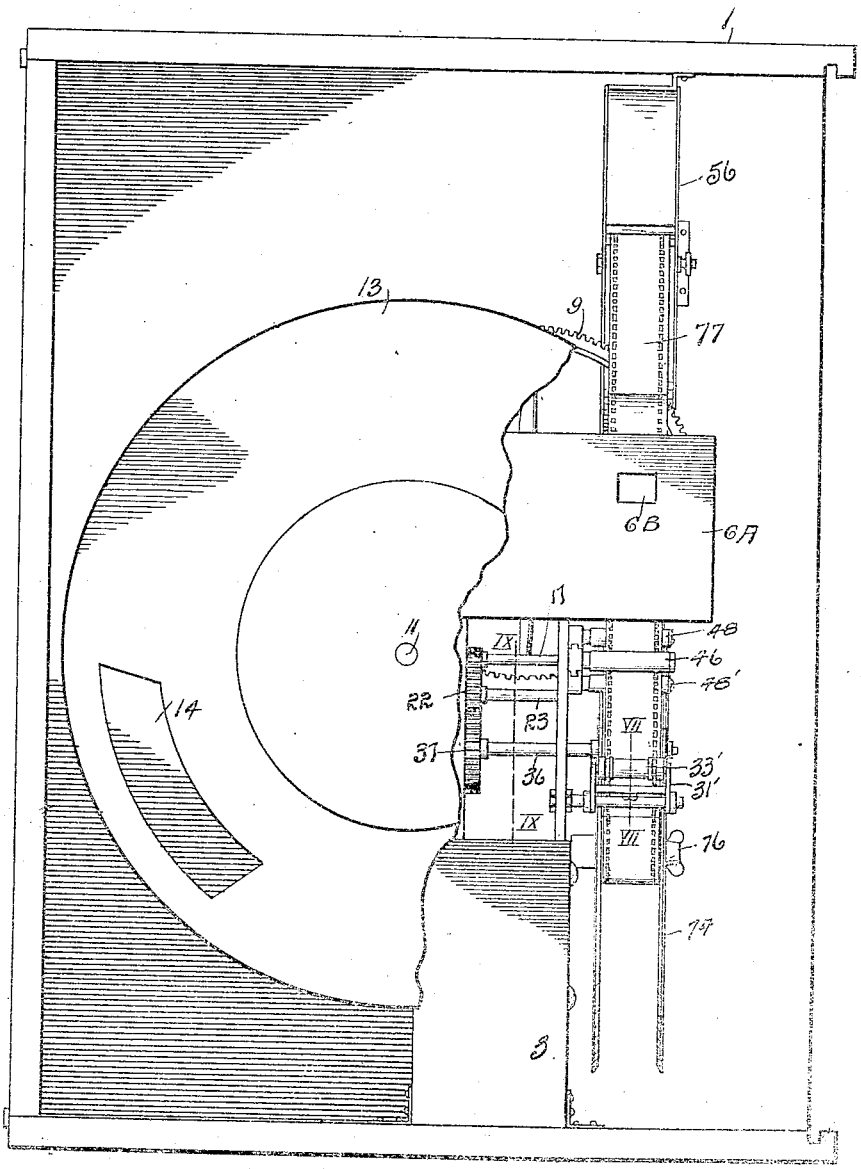

G. W. CURTISS.
CAMERA.
APPLICATION FILED NOV. 29, 1907.
924,147.
Patented June 8, 1909.
5 SHEETS—SHEET 3.
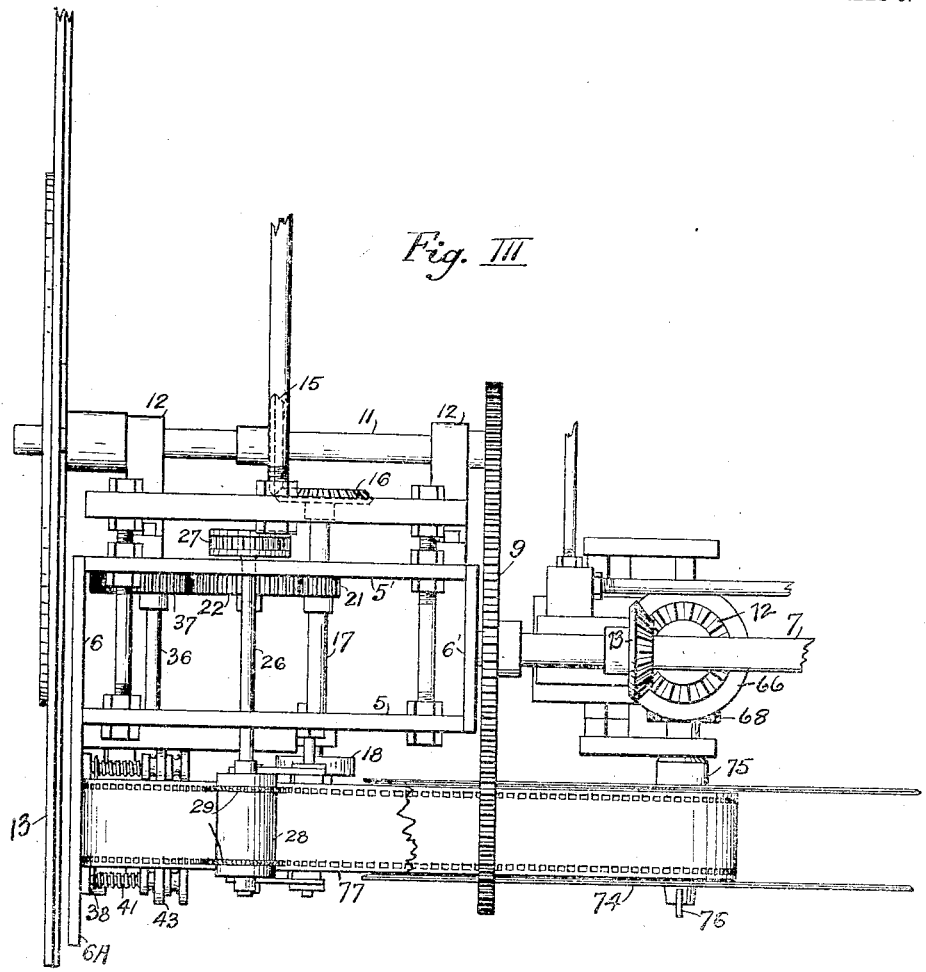
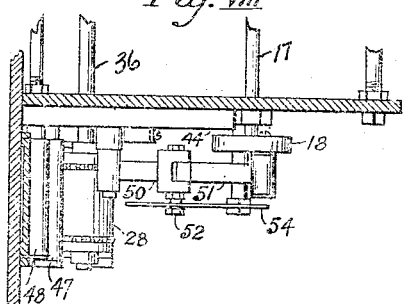
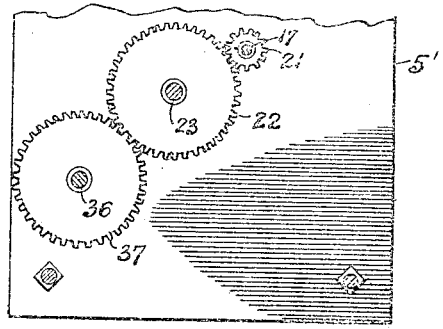
WITNESSES:
R. E. Hamilton
Stanley Savage
INVENTOR.
George W. Curtiss
BY Arthur E. Brown
ATTORNEY.

G. W. CURTISS.
CAMERA.
APPLICATION FILED NOV. 29, 1907.
924,147.
Patented June 8, 1909.
5 SHEETS—SHEET 4.
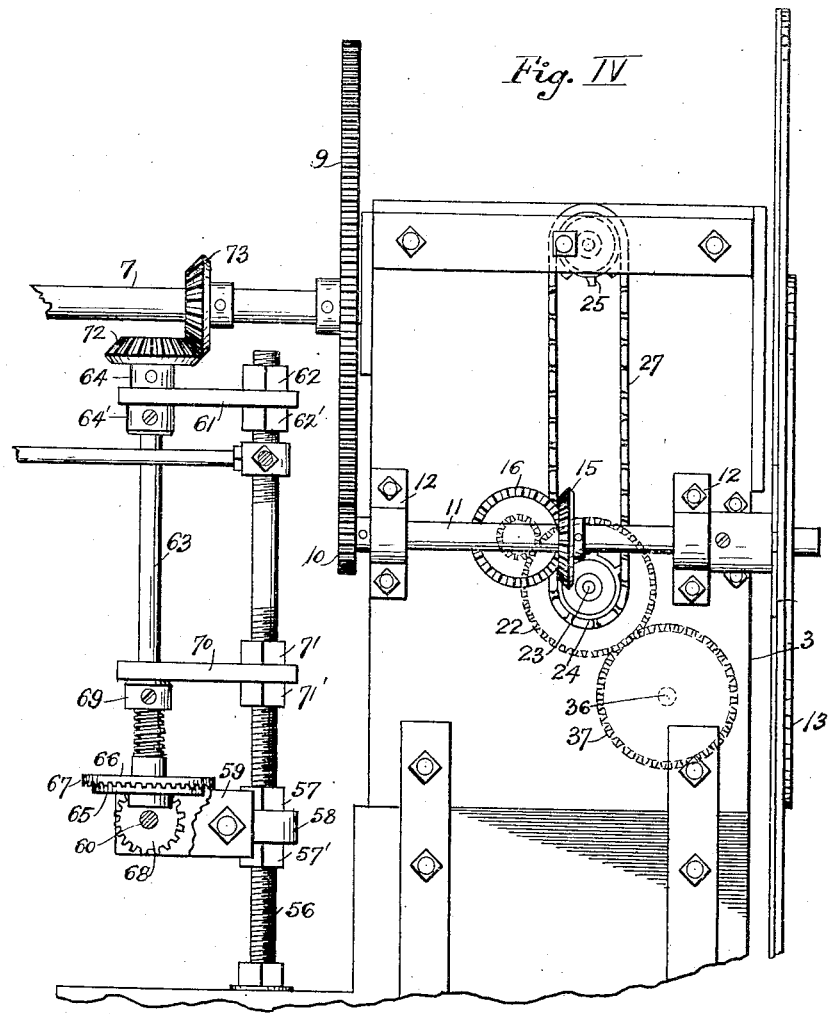
Fig. IV
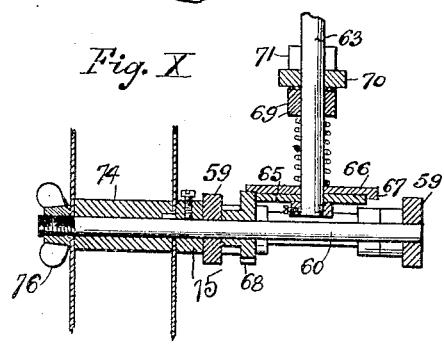
Fig. X
WITNESSES:
R. E. Hamilton
Stanley Savage
INVENTOR.
George W. Curtiss
BY Arthur C. Brown
ATTORNEY.

G. W. CURTISS.
CAMERA.
APPLICATION FILED NOV. 29, 1907.
924,147.
Patented June 8, 1909.
5 SHEETS—SHEET 5.
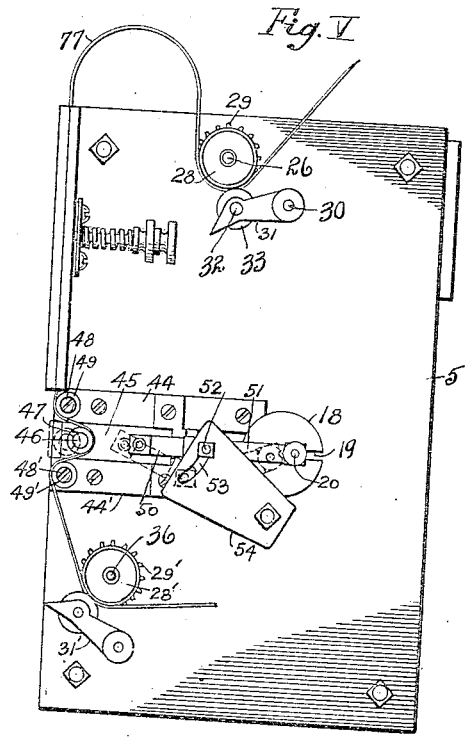
Fig. V.
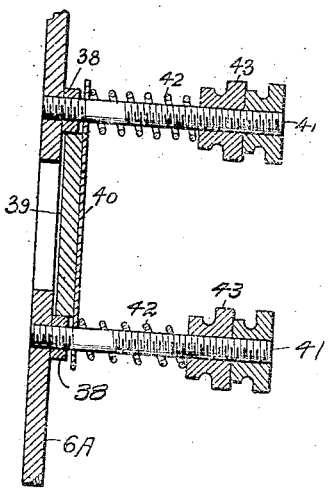
Fig. VI.
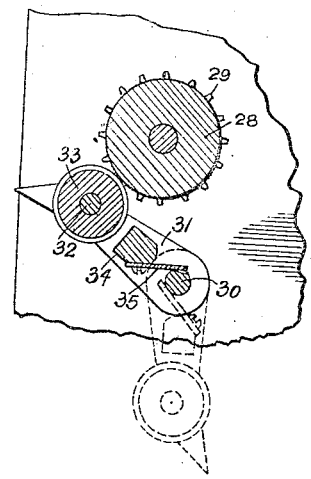
Fig. VII.
WITNESSES:
R E Hamilton
Stanley Savage
INVENTOR.
George W. Curtiss
BY Arthur C Brown
ATTORNEY.

UNITED STATES PATENT OFFICE.

GEORGE W. CURTISS, OF KANSAS CITY, MISSOURI.

CAMERA.

No. 924,147.      Specification of Letters Patent.      Patented June 8, 1909.

Application filed November 29, 1907. Serial No. 404,399.

*To all whom it may concern:*

Be it known that I, GEORGE W. CURTISS, a citizen of the United States, residing at Kansas City, in the county of Jackson and State of Missouri, have invented certain new and useful Improvements in Cameras; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cameras, and more particularly to a camera for photographing moving objects, in which the film is formed in a continuous web, and adapted for travel between a pair of reels, and in proximity to a moving shutter, so that successive impressions may be received upon successive portions of the film.

The principal object of my invention is to provide means for intermittently moving the film a certain predetermined distance between exposures, to insure a regular sequence of the impressions on the film, and to provide improved film handling parts.

A further object is to provide the other improved details of structure which will presently be fully described and pointed out in the claims, reference being had to the accompanying drawings forming part of this specification, in which like reference numerals refer to like parts throughout the several views, and in which:—

Figure I is a view in side elevation of a camera constructed according to my invention, the frame side being removed to illustrate the working parts. Fig. II is a view of same in front elevation, the frame front and a portion of the shutter plate being removed. Fig. III is an enlarged top plan view of the film controlling parts and shutter plate. Fig. IV is an enlarged view in side elevation, of the film and shutter actuating mechanism. Fig. V is an enlarged view, in side elevation, of the intermittent film feeding mechanism. Fig. VI is an enlarged detail view of the tensioning frame for steadying the film when behind the shutter opening. Fig. VII is an enlarged detail view of one of the film forwarding drums and friction rollers, on the line VII—VII, Fig. II. Fig. VIII is a top plan view of the intermittent film feeding mechanism. Fig. IX is a detail view of the gearing through which the lower film drum is operated, on the line IX—IX, Fig. II. Fig. X is a detail view of the friction clutch through which the lower film reel is operated.

Referring more in detail to the parts;—
1 designates a casing, of suitable size and construction, within which the camera parts are located. In the front of, and projecting through casing 1 is a lens case 2, within which a suitable lens (not shown) is located.

Within casing 1, and supported on the bottom thereof, is a frame 3, comprising the base portion 4, and the upwardly projecting side plates 5—5', and the front and back plates 6—6'; the front plate 6 having a laterally projecting portion 6^A, upon the rear of which the mechanism for imparting an intermittent motion to the film is mounted, and said portion being provided with an opening 6^B in line with the camera lens, and through which an impression is made on the film.

Journaled in bearings in the back of frame 3 and in the back of casing 1, and projecting through the latter, is a shaft 7, which is provided on its outer end with a crank 8. Rigidly mounted on shaft 7, adjacent to frame 3, is a gear wheel 9, which meshes with a small gear wheel 10, rigidly mounted on a shaft 11, which is revolubly mounted in bearings in brackets 12 on frame 3. The forward end of shaft 11 projects beyond frame 3 and carries a shutter plate 13 which is keyed or otherwise rigidly secured thereto; said plate being provided with a shutter opening 14, the ends of which are cut at the angle shown in order that an even exposure of the film may be secured.

Rigidly mounted on shaft 11 is a beveled gear wheel 15, and meshing with wheel 15 is a pinion 16, which is rigidly mounted on the end of a shaft 17 which is journaled in and projects through the side plates of frame 3. On shaft 17, at the end opposite pinion 16, is rigidly mounted the pitman wheel 18, having a radial slot 19 in which the pitman bolt 20 is secured, in a manner and for a purpose presently set forth.

Rigidly mounted on shaft 17 is a gear wheel 21, which meshes with a wheel 22 rigidly mounted on a shaft 23, also journaled in and projecting from the sides of frame 3. Rigidly mounted on shaft 23 is a sprocket wheel 24, and traveling over wheel 24 and over a similar wheel 25, on a shaft 26 journaled in and projecting from the sides of frame 3 above wheel 24, is a belt 27. Rigidly mounted on shaft 26, above the pitman wheel, is a drum 28, having a double row of peripheral studs 29, adapted to fit within the side perforations of a film web.

Loosely mounted on a stub axle 30 adjacent to drum 28 is a yoke 31, on the shaft 32, connecting the arms of which, is revolubly mounted a bearing roller 33 adapted to bear against and retain the film web in engagement with drum 28. On a dog 34 on yoke 31 is a spring member 35 adapted for impingement against axle 30, for the purpose of preventing a free movement of the yoke thereon.

36 designates a shaft which is journaled in, and projects at one end beyond frame 3, and has rigidly secured thereto a spur wheel 37, which meshes with the wheel 22 on shaft 23. Rigidly mounted on the projecting end of shaft 36 is a drum 28' having studs 29' adapted to enter the perforations in the film web, as described in connection with drum 28; these parts as well as the roller yoke 31' and its parts, being duplicates of those previously described in the relation mentioned.

On the laterally projecting portion 6A, at each side of and parallel with the sides of the opening 6B, are the web guides 38, and fitting between said guides, and adapted to press against said web is a friction block 39. Block 39 has a back plate 40 which projects beyond its sides and has perforations in such projecting portions through which the bolts 41 extend to their seats in the frame pieces 6A. Surrounding each of bolts 41 is a coil spring 42 adapted to bear against plate 40 and against a nut 43 on bolt 41, for the purpose of yieldingly pressing block 39 against the web; the tension of said springs being regulated by turning nuts 43 on their threads in the usual manner.

On the side 5 of frame 3, below the friction block, is the mechanism for imparting an intermittent feed to the film web; this mechanism comprising a pair of horizontal rails 44—44', suitably spread to provide a path therebetween for the sliding bar 45, upon the forward end of which is mounted a stub axle 46 upon which is mounted a roller 47. On each of rails 44—44' is a stub shaft 48—48', and revolubly mounted on said shafts are the rollers 49—49', preferably of the same size and construction as roller 47.

Pivotally mounted on sliding bar 45 is the pitman link 50 which projects rearwardly and is pivoted at its end to the forward end of the link 51, the rear end of which latter is pivoted to the pitman wheel 18 by bolt 20. The pivot pin 52 joining the pitman links, projects outwardly through an arcuate slot 53 in a plate 54 rigidly mounted on frame 3, and serves to limit the extent of the pitman stroke, as will presently be more fully disclosed.

Within casing 1, at the top, is a shaft 55, upon which the reel 56 may be revolubly mounted, there being a suitable friction device provided if desired, for preventing the web from unwinding at a greater speed than it is taken up by the receiving reel.

Supported on the frame base 4 is a vertical shaft 56, between a pair of nuts 57—57', on which, is mounted a bracket 58, having yoke arms 59, in which is revolubly mounted a shaft 60.

61 indicates a bracket, loosely mounted on shaft 56, but held in a desired position near the top thereof by means of nuts 62—62'; which bracket is provided at its outer end with yoke arms which straddle a shaft 63 between a pair of collars 64—64'; said collars being rigid on shaft 63 but so adjusted as to permit free revolution of said shaft, although supported by said yoke arms. On the bottom of shaft 63 is rigidly secured a friction plate 65, and bearing against the upper face of said plate and loosely mounted on said shaft, is a mating plate 66, of greater diameter than plate 65, and provided with a down turned peripheral flange 67, having gear teeth adapted to mesh with the teeth of a gear wheel 68, rigidly mounted on shaft 60. Surrounding shaft 63, and bearing against the top of plate 66 and bottom of a collar 69, rigid on shaft 63, is a compression spring, adapted for yieldingly retaining plate 66 in frictional engagement with plate 65.

70 indicates a bracket adjustably mounted on shaft 56 between nuts 71—71', and adapted for bracing shaft 63, and 72 is a beveled gear wheel rigidly mounted on shaft 63 and meshing with a similar wheel 73, rigid on the crank shaft 7.

Fitting loosely over the outer end of shaft 60 is the film web receiving reel 74, which may be tightened against a collar 75, on said shaft, by means of a thumb nut 76.

77 designates the film web, which extends between the reels noted, and is operated as I will now describe.

When in use, the upper reel (carrying a film web) is placed on its carrying axle, and the web posited under the upper forwarding drum, with the drum studs in the web side perforations; down through the tension frame; in front of roller 49, behind roller 47 on the sliding bar 45, and back around roller 49'; thence under the lower forwarding drum and back to the lower reel, to the hub of which it is secured. In operating the camera, the driving shaft 7 is revolved, by means of its crank, and the shutter plate shaft 11 revolved through the gearing previously mentioned, which is adapted to revolve said plate at a high speed. Upon the revolution of the shutter plate shaft, the shaft 17, carrying the pitman wheel 18 is revolved, and the gear wheel 21 on said shaft actuates the shafts 23 and 36 through the gearing mentioned, the former actuating shaft 26 upon which the upper forwarding drum 28 is mounted, through the sprocket and chain, and the latter actuating the lower drum 28' which is directly mounted on shaft 23. The beveled gear wheels 15 and 16 on the shutter plate and pitman wheel shafts respectively, being of the same degree, cause said plate and wheel to be revolved at the same speed, while the gearing on the forwarding drum parts is arranged to secure one complete revolution of said drums to four revolutions of the shutter plate and pitman wheel. While the machine is in operation therefore, the upper forwarding drum causes a continuous forward feed of the film web from the upper reel to the tension case in line with the exposure opening, the parts being so positioned as to allow a space in which a portion of the web may rest before being drawn into said case. While the web is continuously fed to the case noted, it is withdrawn therefrom intermittently, in order that the film may remain stationary before the exposure opening during the passage of the shutter opening therebefore. While the upper drum 28 is forwarding the web to position over the tension case, the pitman wheel 18 is being revolved, causing a reciprocation of the sliding bar 45 in its frame. At each forward movement of bar 45 the lower drum 28' takes up the portion of the film web forwarded from the tension case, and at the rearward motion of said bar the roller 47 draws the web down from the case to expose a subsequent film portion, the portion of the web below the sliding bar being held by drum 28', so that a back feed is obviated.

By providing the pitman wheel with the radial slot 19 the rear pitman link may be adjusted to secure a proper operation of the combined parts.

By means of the jointed pitman an actual operation of the sliding bar is had only during about one-quarter of the revolution of the pitman wheel, three quarters of the revolution being taken up in breaking and straightening the link joint; and to insure such an operation the pivot pin joining the pitman links is projected through the arcuate slot in the plate 54, and an even, steady and constant pitman stroke and sliding bar reciprocation secured.

After passing under the drum 28', the film web is wound on the lower reel 74, which is revolved by the friction clutch previously described, the driving shaft of which is actuated by the beveled gear wheels 72 and 73. With such an arrangement the film web may be held in a constantly taut condition without danger of breakage, as should the lower reel tend to take up the web faster than it is fed through the intermittent forwarder the clutch will slip and prevent breakage of the web.

By mounting the brackets which support the friction clutch shaft, in the manner described, a perfect adjustment of the parts may be had.

Having thus described my invention, what I claim as new therein, and desire to secure by Letters Patent is—

1. In a camera, a web feeding mechanism comprising a sliding bar, a stationary web engaging member at each side of said bar, a web engaging member carried by said bar, a driving link pivotally mounted on said bar, a second link pivoted to said first link, and means for actuating said second link, for the purpose set forth.

2. In a camera, a web feeding mechanism comprising a reciprocating bar, a stationary web engaging member at each side of said bar, a web engaging member carried by said bar, a link pivoted on said bar, a second link pivoted to said first link, means for actuating said second link, and means for limiting the travel of said bar.

3. In a camera, a web feeding mechanism comprising a reciprocating bar, a web engaging member at each side of said bar, a web engaging member carried by said bar, a link pivoted to said bar, a second link member and means for actuating same, a slotted plate adjacent to said links, each of said links being perforated at their adjacent ends, and a pivot pin extending through said perforations and through the slot in said plate, for the purpose set forth.

4. In a camera, a web feeding mechanism comprising a reciprocating bar, a web engaging member at each side of said bar, a web engaging member carried by said bar, a link pivoted to said bar, a revoluble shaft, a wheel rigid on said shaft, a link eccentrically mounted on said wheel and projecting toward said bar link, a stationary plate having an arcuate slot, and a pivot pin joining the adjacent ends of said links and projecting through said slot, for the purpose set forth.

5. In a camera, a forwarding mechanism comprising a reciprocating, film engaging member, a driving member, and a jointed pitman connecting said members, said pitman being adjustable on one of said members, for the purpose set forth.

6. In a camera, a forwarding mechanism comprising a reciprocating, film engaging member, a driving member, a jointed pitman connecting said members and separate means for determining the longitudinal and the broken, transverse travel of said pitman.

7. In a camera, a feeding mechanism comprising a reciprocating, film engaging member, a stationary member provided with an arcuate slot, and a pin connected with said reciprocating member and adapted for travel in the slot in said stationary member.

8. In a camera, a feeding mechanism comprising a film engaging member, a sliding bar, a crank wheel, a link pivotally connected with said bar, a link eccentrically mounted on said crank wheel, a stop member and means whereby said links are pivotally connected with each other and slidably connected with said stop member.

9. In a camera, a feeding mechanism comprising a reciprocating, film engaging member adapted to travel forward and back in a fixed path, and means for actuating said member, said actuating means being adjustable to vary the limits of travel of said reciprocating member.

10. In a camera, a forwarding mechanism comprising a reciprocating, film engaging member, a slotted drive wheel, means for revolving said wheel, a pintle carried by said wheel and adapted for radial adjustment in the wheel slot, and a connection between said reciprocating member and said pintle, for the purpose set forth.

11. In a camera, a forwarding mechanism comprising a reciprocating, film feeding member, a link pivoted on said member, a slotted drive wheel, a pintle carried by said wheel and adapted for radial adjustment in the wheel slot, a link movable on said pintle and pivotally connected with said pivoted link, and means for controlling the travel of said links, for the purpose set forth.

12. In a camera, a forwarding mechanism comprising a reciprocating, film feeding member, a slotted driving wheel, means for revolving said wheel, a pivot pin adjustably mounted in and projecting from the wheel slot, a link having one end mounted on said pin, a link pivoted on the reciprocating member, a slotted member, and a pin connecting said links and adapted for limited travel in the slot in said slotted member.

13. In a camera, a forwarding mechanism comprising a reciprocating, film feeding member, a driving mechanism, links pivotally connecting said reciprocating member and said driving mechanism, a slotted member adjustably mounted adjacent to said links, and means projecting from said links and adapted for travel in the slot in said slotted member.

14. In a camera, the combination with a driving shaft, of an auxiliary shaft in operative connection therewith, a friction plate rigid on said auxiliary shaft, a friction plate loosely mounted on said auxiliary shaft, means for yieldingly pressing said second plate against said first plate, a take up reel rigidly mounted on a shaft journaled in bearings adjacent to said auxiliary shaft, a gear wheel on said reel shaft, gear teeth on said loose friction plate meshing with said gear wheel, a let out reel, web forwarding parts, and means connecting said web forwarding parts with said driving shaft, for the purpose set forth.

15. In a camera, the combination with a suitable frame, of a revoluble shaft carried by said frame, means for actuating said shaft, a shutter plate carried by said shaft, a pair of drum shafts journaled in said frame having web forwarding drums thereon, an idler shaft, a sprocket wheel on one of said drum shafts and on said idler shaft and a chain belt traveling over said wheel, meshing gear wheels on said idler shaft and on the second drum shaft, an eccentric shaft journaled in said frame, a gear wheel on said eccentric shaft meshing with the gear wheel on said idler shaft, beveled gear wheels on said eccentric shaft and on the shutter plate shaft in mesh with each other, for the purpose set forth.

In testimony whereof I affix my signature in presence of two witnesses.

GEORGE W. CURTISS.

Witnesses:
GEO. HORN,
ARTHUR C. BROWN.